(12) United States Patent
Wang et al.

(10) Patent No.: US 10,633,118 B2
(45) Date of Patent: Apr. 28, 2020

(54) MOBILE RUSTPROOFING WASHING SYSTEM

(71) Applicant: NATIONAL CHUNG SHAN INSTITUTE OF SCIENCE AND TECHNOLOGY, Taoyuan (TW)

(72) Inventors: Yu-Ping Wang, Taoyuan (TW); Chin-Cheng Wu, Taoyuan (TW); Ming-Jia Wang, Taoyuan (TW); Chun-Yu Chen, Taoyuan (TW); Yi-Rong Zeng, Taoyuan (TW); Kuan-You Liu, Taoyuan (TW); Ming-Ta Hsieh, Taoyuan (TW); Ching-Wen Fan, Taoyuan (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 286 days.

(21) Appl. No.: 15/831,772

(22) Filed: Dec. 5, 2017

(65) Prior Publication Data

US 2019/0055037 A1 Feb. 21, 2019

(30) Foreign Application Priority Data

Aug. 18, 2017 (TW) .............................. 106128047 A

(51) Int. Cl.
*B64F 5/30* (2017.01)
*C02F 9/00* (2006.01)
(Continued)

(52) U.S. Cl.
CPC .................. *B64F 5/30* (2017.01); *B08B 3/02* (2013.01); *B08B 3/08* (2013.01); *B08B 3/14* (2013.01);
(Continued)

(58) Field of Classification Search
CPC ........................................................ B64F 5/30
See application file for complete search history.

(56) References Cited

U.S. PATENT DOCUMENTS 4,341,636 A * 7/1982 Harder .................... B01D 37/00
210/290
5,318,254 A * 6/1994 Shaw ........................ B25J 5/005
239/135

(Continued)

OTHER PUBLICATIONS

Cleaning and Corrosion Control, vol. II Aircraft; Technical Manual.

*Primary Examiner* — Jason Y Ko
(74) *Attorney, Agent, or Firm* — Schmeiser, Olsen & Watts, LLP

(57) ABSTRACT

A mobile rustproofing washing system includes a receptacle, a control module, a water supply module, a filtration module and a washing module. The receptacle is removably disposed on a mobile carrier. The control module is disposed in the receptacle. The water supply module is disposed in the receptacle and includes a front water tank and a rear water tank. The filtration module is connected to the front water tank and the rear water tank. The filtration module receives and filters water from the front water tank. The filtered water is stored in the rear water tank. The washing module connects with the rear water tank and receives water therefrom, so as to carry out a washing process. Therefore, the mobile rustproofing washing system is quick to mount/demount and easy to use, thereby having high mobility.

15 Claims, 8 Drawing Sheets

(51) Int. Cl.

| | |
|---|---|
| *B08B 3/08* | (2006.01) |
| *B08B 3/02* | (2006.01) |
| *B08B 3/14* | (2006.01) |
| *C02F 1/28* | (2006.01) |
| *C02F 1/00* | (2006.01) |
| *C23F 11/00* | (2006.01) |
| *C02F 1/42* | (2006.01) |
| *C02F 1/68* | (2006.01) |
| *C02F 103/44* | (2006.01) |

(52) U.S. Cl.
CPC ............... *C02F 9/00* (2013.01); *C02F 9/005* (2013.01); *C02F 1/004* (2013.01); *C02F 1/281* (2013.01); *C02F 1/283* (2013.01); *C02F 1/285* (2013.01); *C02F 1/42* (2013.01); *C02F 1/686* (2013.01); *C02F 2001/422* (2013.01); *C02F 2001/425* (2013.01); *C02F 2103/44* (2013.01); *C02F 2201/008* (2013.01); *C02F 2209/40* (2013.01); *C02F 2303/08* (2013.01); *C23F 11/00* (2013.01)

(56) References Cited

U.S. PATENT DOCUMENTS

| | | | |
|---|---|---|---|
| 6,565,758 B1* | 5/2003 | Thomas | B64F 5/30 134/10 |
| 2002/0002985 A1* | 1/2002 | Mathieu | B08B 3/026 134/10 |
| 2010/0106265 A1* | 4/2010 | Ebrom | H04L 69/26 700/90 |
| 2011/0036418 A1* | 2/2011 | Hendy | B08B 3/02 137/335 |

* cited by examiner

MOBILE RUSTPROOFING WASHING SYSTEM

FIELD OF THE INVENTION

The present invention relates to washing systems and, more particularly, to a mobile rustproofing washing system.

BACKGROUND OF THE INVENTION

Surrounded by waters and industrially developed, Taiwan is rife with corrosive environments which not only feature warm climates, high humidity, and salty air but also produce industrial acidic wastes, such as hydrogen sulfide and sulfur dioxide. High-priced aircraft flying in the aforesaid environments are susceptible to rusting.

To reduce manpower and time spent on washing aircraft, the conventional way of quick washing requires that the aircraft taxi-through automated washing facilities, for example, a spraying device, for 30 seconds to two minutes. The aforesaid washing facilities eliminate corrosion factors, such as soluble salts, sand and dust, from the surfaces of the aircraft by spraying jet water, thereby cleaning and protecting the aircraft against corrosion.

A typical commercially-available taxi-through washing system is stationary, and its related water purification facilities (including a power distribution module, water supply module, filtration module, washing module, and monitoring module) and control module are fixed in place and indoors, leading to drawbacks as follows: expensive and time-consuming to build, taking up much space, neither removable nor movable, as well as pricey to change, repair or move.

Accordingly, it is imperative to provide a mobile rustproofing washing system quick to mount/demount, deliver and install and easy to use so as to not only extend the service life of its parts and components but also enhance its logistic and managerial performance.

SUMMARY OF THE INVENTION

In view of the aforesaid drawbacks of the prior art, it is an objective of the present invention to provide a mobile rustproofing washing system which not only takes up little space because of its mobility but also allows introduction of anti-corrosion chemicals while aircraft are being washed to augment the anti-corrosion capability of the aircraft.

In order to achieve the above and other objectives, the present invention provides a mobile rustproofing washing system which comprises a receptacle, a control module, a water supply module, a filtration module and a washing module. The receptacle is removably disposed on a mobile carrier. The control module is disposed in the receptacle. The water supply module is disposed in the receptacle and comprises a front water tank and a rear water tank. The filtration module is connected to the front water tank and the rear water tank. The filtration module receives and filters water from the front water tank and stores the filtered water in the rear water tank. The washing module connects with the rear water tank and receives water therefrom, so as to carry out a washing process.

Therefore, the mobile rustproofing washing system of the present invention is quick to mount/demount, deliver and install, and features ease of use. With all the modules being mounted in the receptacle, the receptacle can operate immediately after being delivered to an appropriate venue, thereby the receptacle has high mobility.

In an embodiment, the receptacle is a container, a general box or a special box, which is at least 20 feet long.

In an embodiment, the mobile rustproofing washing system further comprises a chemical-dispensing module connected to the filtration module to dispense thereto anti-corrosion chemicals. The chemical-dispensing module is disposed beside the rear water tank and connected to the filtration module to dispense anti-corrosion chemicals, thereby enhancing the anti-corrosion capability of an object being washed with the washing water.

In an embodiment, at least a ventilation grill for external access is disposed on the wall of the receptacle. The receptacle is divided into two compartments in communication with each other by a door. The small compartment is a control room in which a technician monitors and operates anti-corrosion washing equipment. The control room has therein a power distribution unit, control module and door for external access. The large compartment is a machine room which houses various modules of anti-corrosion washing equipment. The machine room has therein a port, water supply module, filtration module, chemical-dispensing module, washing module, monitoring unit, doors for external access, and ventilation grills for external access. The doors for external access face and are opposite the ventilation grills for external access, respectively, to enhance circulation of air.

In an embodiment, the filtration module further comprises a booster pump for receiving water from the front water tank and effecting pressurization. Moreover, the filtration module further comprises a plurality of filters connected to the booster pump to receive pressurized water. The plurality of filters comprises a first filter connected to the booster pump and having a filter medium including quartz sand, a second filter connected to the first filter and having a filter medium including activated carbon, a third filter connected to the second filter and having a filter medium including divinylbenzene copolymer, and a fourth filter connected to the third filter and having a filter element of a pore diameter of 0.1 μm~20 μm. The filtration module further comprises a plurality of control valves disposed at the first filter and the second filter to control water flow directions of the filters, respectively. The filtration module further comprises a plurality of electrically-operated valves disposed at the first filter, the second filter, the third filter and the fourth filter to guide water through the filters, respectively.

Therefore, the present invention is advantageous in that it uses the electrically-operated valves to determine whether water is to flow through the respective filters and uses the control valves to control the directions of water flow in the filters respectively.

In an embodiment, the mobile rustproofing washing system further comprises a water quality monitoring unit connected to the filtration module and adapted to monitor a water quality data and send the water quality data to the control module, so as to effect real-time monitoring of water quality. The water quality monitoring unit is a chloride ion gauge, thermometer, pH meter, or conductivity meter, but the present invention is not limited thereto.

In an embodiment, the mobile rustproofing washing system further comprises a video recording unit disposed on an outer surface of the receptacle to capture a frame information and send the frame information to the control module, so as to monitor the washing process and enable the control module to control the washing module accordingly.

In an embodiment, the washing module further comprises an outward-extending rail platform and a washing water cannon. The outward-extending rail platform is extendably disposed at the window of the receptacle and can be pulled and extended outward. The washing water cannon is disposed at the outward-extending rail platform. After being pulled out of the receptacle, the outward-extending rail platform can be fixed to the ground, and then the outward-extending rail platform is available for use upon adjustment of the angle of elevation of the washing water cannon. The spraying direction of the washing water cannon can be adjusted in accordance with use requirements or storage requirements. The washing water cannon is connected to the control module which controls its water pressure, angle of elevation, orientation or spraying mode. Moreover, output parameters of the washing water cannon are adjusted by hand or automatically, and the washing water cannon is powered by electricity, water pressure, oil pressure or air pressure.

In an embodiment, the control module controls the filtration module, chemical-dispensing module, washing module and video recording unit, wherein the control module controls the electrically-operated valves of the filtration module to turn on and turn off so as to determine the filtration route of water, controls the chemical-dispensing module to determine the chemical dispensing speed, controls the water pressure, angle of elevation, orientation or spraying mode of the washing water cannon, and controls the shooting angle of the video recording unit and frame distances.

In an embodiment, the mobile rustproofing washing system further comprises a supporting unit disposed in the receptacle. The supporting unit comprises a plurality of annular fastening elements, a plurality of L-shaped legs, and a plurality of damping pads. The annular fastening elements are C-shaped steel rings for fixing the control module, water supply module, filtration module and washing module to the supporting unit. The L-shaped legs are disposed at the bottom or a lateral side of the supporting unit to fix the supporting unit to the bottom side of the receptacle or a wall. The damping pads are disposed between the control module, water supply module, filtration module, washing module and supporting unit or disposed between the L-shaped legs and the bottom side of the receptacle or the wall. Therefore, the supporting unit enhances stability and reduces vibration of modules of the mobile rustproofing washing system in operation or while a mobile carrier carrying the receptacle is moving on uneven surfaces, such as soil and sand, thereby preventing the modules from falling off and getting damaged.

In this embodiment, the water supply module, filtration module, chemical-dispensing module, and washing module of the mobile rustproofing washing system are arranged in a U-shaped pattern within the receptacle and sequentially in accordance with the direction of water flow to therefore reduce otherwise unavailable space within the receptacle, thereby allowing the mobile rustproofing washing system to take up minimum space. An entrance/exit and central space, which together result from the U-shaped pattern, not only serve as a passage for use by technicians but also lead to a door whereby the two compartments are in communication with each other such that the technicians can reach every corner in the two compartments and carry out maintenance to the modules. The washing water cannon of the washing module is mounted on the outward-extending rail platform. The outward-extending rail platform is disposed at the window on the long side of the receptacle such that the technicians can start to use the washing water cannon after pulling out the outward-extending rail platform, thereby enhancing the ease of anti-corrosion washing.

The above summary, the detailed description below, and the accompanying drawings further explain the technical means and measures taken to achieve predetermined objectives of the present invention and the effects thereof. The other objectives and advantages of the present invention are explained below and illustrated with the accompanying drawings.

DETAILED DESCRIPTION OF THE PREFERRED EMBODIMENTS

To enable persons skilled in the art to fully understand the objectives, features, and advantages of the present invention, the present invention is illustrated with specific embodiments, depicted by the accompanying drawings, and described hereunder.

Figure 1:
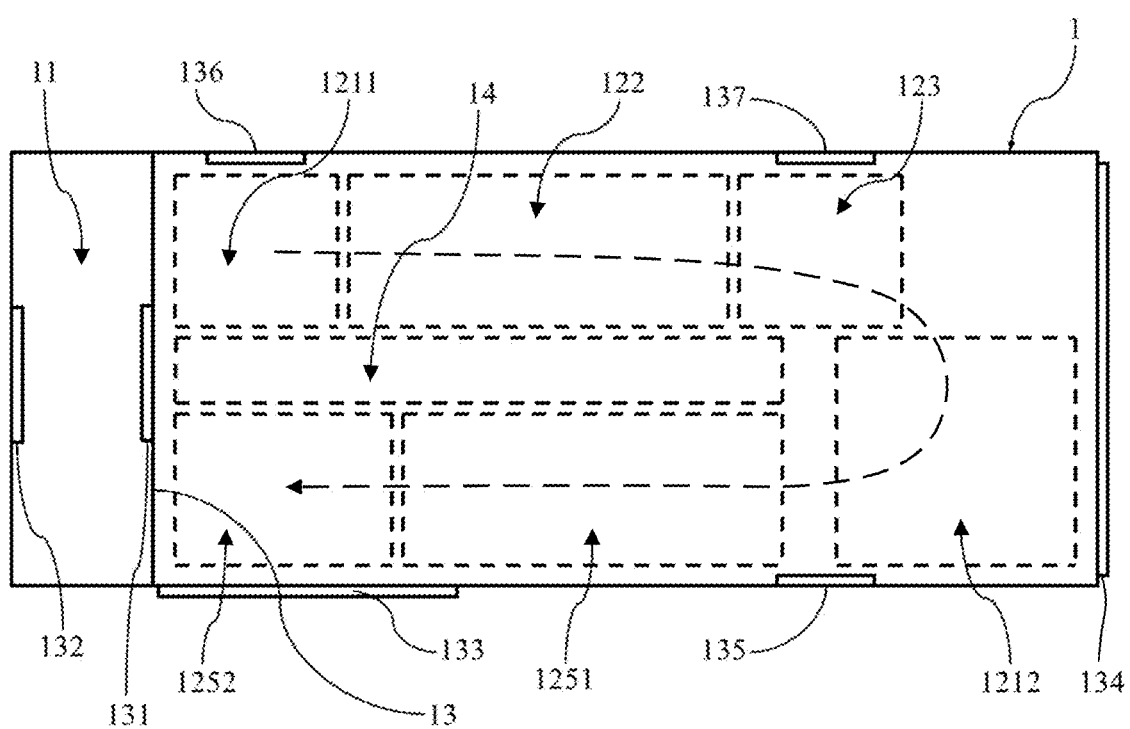
FIG. 1 is a schematic view of layout of a mobile rustproofing washing system of the present invention.
Figure 2:
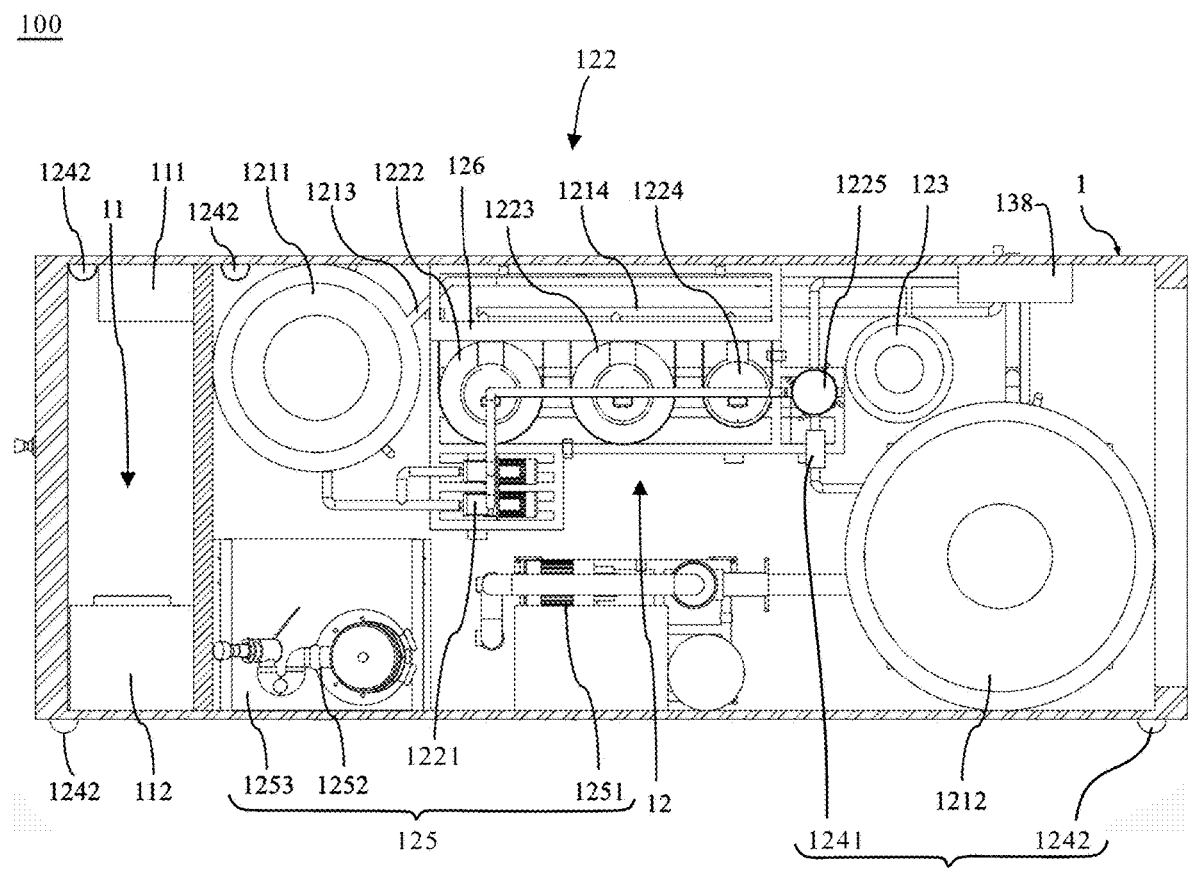
FIG. 2 is a top view of the mobile rustproofing washing system of the present invention.
Figure 3:
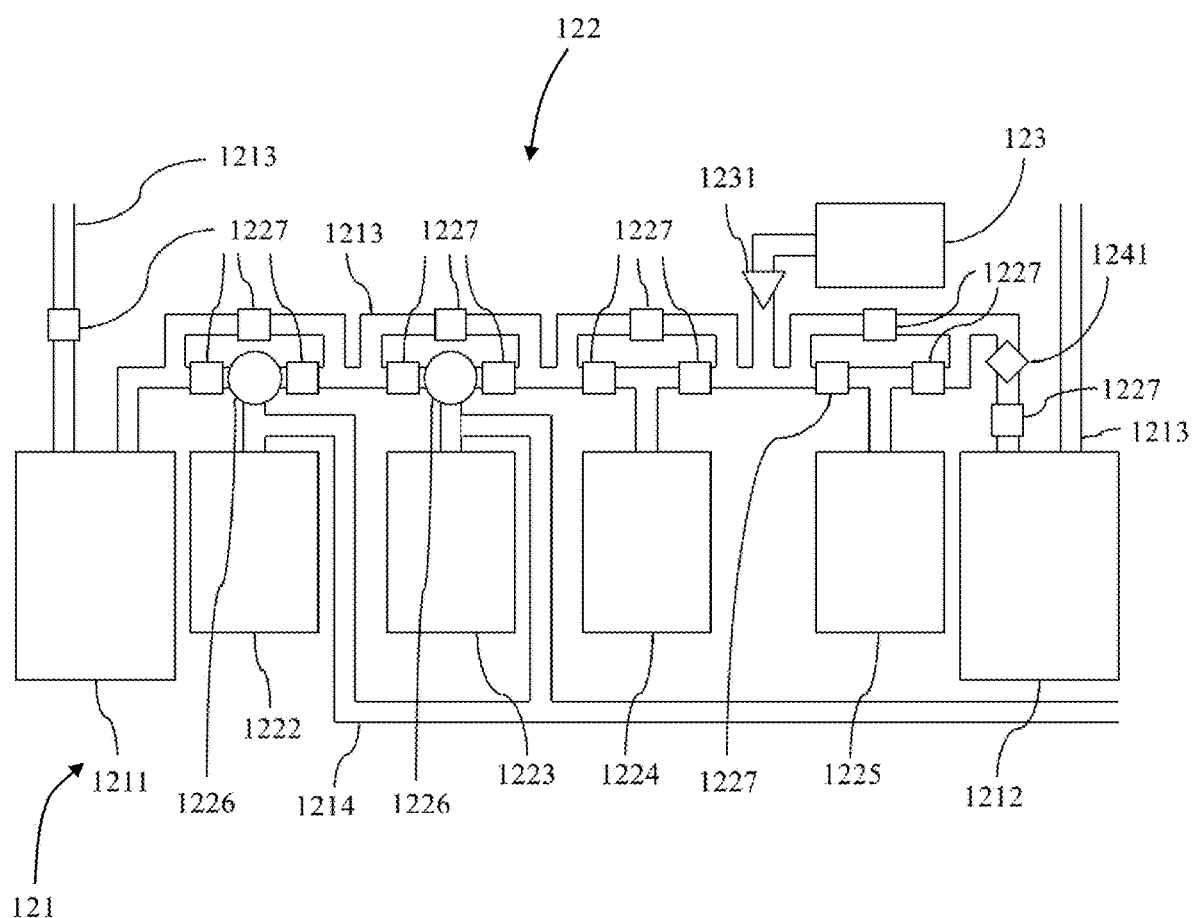
FIG. 3 is a schematic view of a water supply module, filtration module, chemical-dispensing module and water quality monitoring unit of the mobile rustproofing washing system of the present invention.

Referring to FIG. 1, FIG. 2 and FIG. 3, there are shown a layout schematic view and a top view of a mobile rustproofing washing system 100 of the present invention, and a schematic view of a water supply module, filtration module, chemical-dispensing module and water quality monitoring unit of the mobile rustproofing washing system 100 of the present invention, respectively. As shown in FIG. 1, FIG. 2 and FIG. 3, the mobile rustproofing washing system 100 of the present invention comprises a receptacle 1, a control room 11, a water supply module 121, a filtration module 122, a chemical-dispensing module 123, a monitoring module 124, and a washing module 125.

The receptacle 1 is removably disposed on a mobile carrier and is a closed space (for example, a container at least 20 feet long). The receptacle 1 has therein a port 138 connected to an external power source and water source to supply power to the control room 11 and water to the water supply module 121, respectively.

The receptacle 1 is divided into at least two compartments separated by a wall 13. Disposed on the wall 13 is at least a door, namely a passage door 131. One of the compartments is the control room 11, and another compartment is a machine room 12. The control room 11 has at least a door for external access, namely a control room door 132. The machine room 12 has at least two doors for external access, namely a machine room door 133 disposed on a long side of the receptacle 1 and a machine room door 134 disposed on a short side of the receptacle 1. The machine room 12 has three ventilation grills 135, 136, 137 which open outward. The ventilation grill 135 is disposed on the same long side as the machine room door 133. The ventilation grill 136 is disposed on the other long side of the receptacle 1 as well as opposite and parallel to the machine room door 133. The ventilation grill 137 is disposed on the other long side of the receptacle 1 as well as opposite and parallel to the ventilation grill 135.

The control room 11 is disposed at one end of the receptacle 1 and comprises therein a control module 112 and a power distribution unit 111. The power distribution unit 111 is connected to the control module 112, filtration module 122, chemical-dispensing module 123, monitoring module 124 and washing module 125 to supply power thereto. The control module 112 connects with and controls the filtration module 122, chemical-dispensing module 123, monitoring module 124 and washing module 125.

The water supply module 121 is disposed in the receptacle 1 to receive water from the port 138 through a water pipe 1213. The water supply module 121 comprises a front water tank 1211 and a rear water tank 1212. The front water tank 1211 is disposed beside the control room 11 to store washing water to be filtered and treated with chemicals. The rear water tank 1212 is disposed at the other end of the receptacle 1 to store washing water filtered and treated with chemicals. The water supply module 121 further comprises a fill pipe 1213 and a drain pipe 1214. The fill pipe 1213 is connected to the port 138, front water tank 1211, filtration module 122, rear water tank 1212 and washing module 125 to feed washing water thereto. The drain pipe 1214 is connected to the first filter 1222 and the second filter 1223 to drain waste water produced in the reverse washing process and the forward washing process.

The filtration module 122 is disposed beside the front water tank 1211 and connected to the front water tank 1211 and the rear water tank 1212. The filtration module 122 receives and filters water from the front water tank 1211 and stores the filtered water in the rear water tank 1212. The filtration module 122 further comprises a booster pump 1221, a plurality of filters 1222, 1223, 1224, 1225, a plurality of electrically-operated valves 1227 and a plurality of control valves 1226. The booster pump 1221 receives water from the front water tank 1211. The plurality of filters 1222, 1223, 1224, 1225 connects with the booster pump 1221 to receive pressurized water and filter it. For illustrative sake, the plurality of filters 1222, 1223, 1224, 1225 is herein defined as a first filter 1222, a second filter 1223, a third filter 1224, and a fourth filter 1225. The filter medium of the first filter 1222 includes an upper layer of Clino-X sand with granular size of 0.5~5 mm, an intermediate layer of quartz sand with granular size of 0.1~1 mm, and a lower layer of filter stones with granular size of 1~10 mm to remove gravel, soil and heavy metal ions. The filter medium of the second filter 1223 is activated carbon of a specific surface area $\geq 1000$ $m^2/g$ to remove organic matter. The filter medium of the third filter 1224 includes anion resin (sulfonated styrene divinylbenzene copolymer) and cation resin (alkyl quaternary ammonium styrene divinylbenzene copolymer) to remove anions and cations. The fourth filter 1225 has a filter element of a pore diameter 0.1~20 μm to remove particles of nanoscale and larger size.

A plurality of electrically-operated valves 1227 is turned on and turned off by hand or automatically under the control of the control module 112 to change the route of water flow. The passage for incoming water is determined by the plurality of control valves 1226 by hand or automatically under the control of the control module 112 to change the direction of water flow. A reverse washing process requires water to flow upward so as to not only stir the filter medium and separate impurity from the filter medium but also drain waste water by the drain pipe 1214. A forward washing process requires water to flow downward so as to eliminate impurity not removed in the reverse washing process, compress the filter medium anew, and drain waste water by the drain pipe 1214.

The chemical-dispensing module 123 stores anti-corrosion chemicals and dispenses the anti-corrosion chemicals to the filtration module 122. The chemical-dispensing module 123 is connected between the third filter 1224 and the fourth filter 1225 and dispenses the anti-corrosion chemicals to the washing water being filtered, thereby enhancing the anti-corrosion capability of an object being washed.

In this embodiment, the washing water purified by the filtration module 122 and enhanced with anti-corrosion chemicals dispensed by the chemical-dispensing module 123 meets requirements of specifications of washing water required for an anti-corrosion washing process stipulated in Aircraft, chapter two of an operating manual, *Cleaning and Corrosion Control* (NAVAIR 01-1A-509-2, TM 1-1500-344-23-2), published by Naval Air Systems Command, the United States, as shown in Table 1 below.

TABLE 1

| Test Item | Specification |
| --- | --- |
| Chlorides | ≤400 mg/L |
| pH | 6.5~8.5 |
| Total Dissolved Solids (TDS) | ≤500 mg/L |
| Total Suspended Solids (TSS) | ≤5 mg/L |
| Hardness | 75~150 mg/L |
| Biological Oxygen Demand (BOD) | ≤5 mg/L |
| Total Petroleum Hydrocarbon (TPH) | ≤10 mg/L |
| Langelier Saturation Index (LSI) | slightly above zero |

The monitoring module 124 comprises at least a water quality monitoring unit 1241 and at least a video recording unit 1242. The at least a water quality monitoring unit 1241 is disposed between the fourth filter 1225 and the rear water tank 1212 and is in signal communication with the control module 112 so as to monitor a water quality data of the filtration module 122. The at least a video recording unit 1242 is disposed on an inner surface or outer surface of the receptacle 1 to capture a frame information pertaining to the washing process and is in signal communication with the control module 112 so as to send the frame information.

The washing module 125 comprises a water cannon pump 1251, a washing water cannon 1252 and an outward-extending rail platform 1253. The water cannon pump 1251 is connected to the rear water tank 1212 to receive water filtered and treated with chemicals and pressurized the water. The washing water cannon 1252 is mounted on the outward-extending rail platform 1253 and connected to the water cannon pump 1251 to receive the pressurized water, so as to facilitate the washing process. The outward-extending rail platform 1253 is disposed in the receptacle 1 and positioned proximate to the machine room door 133. After being pulled out of the receptacle 1, the outward-extending rail platform 1253 is fixed to the ground and ready to function upon adjustment of the angle of elevation of the washing water cannon 1252. The spraying direction of the washing water cannon 1252 can be adjusted in accordance with use requirements or storage requirements. The washing water cannon 1252 is connected to the control module 112 for adjusting the output water pressure, angle of elevation, orientation or spraying mode of the washing water cannon 1252. Output parameters of the washing water cannon 1252 can be adjusted by hand or automatically.

Referring to FIG. 1, in this embodiment, the front water tank 1211, filtration module 122, chemical-dispensing module 123, rear water tank 1212, water cannon pump 1251 and washing water cannon 1252 are arranged in a U-shaped pattern within the machine room 12 and sequentially in accordance with the direction of water flow. The central space which results from the U-shaped pattern serves as a passage 14 for technicians to move within the machine room 12. The entrance/exit which results from the U-shaped pattern serves as an entrance/exit for technicians to enter/exit the machine room 12 and the control room 11. The passage 14 is disposed between the washing module 125, the front water tank 1211 and the filtration module 122. One end of the passage 14 is in communication with the control room 11 by a separation door 131.

Figure 4:
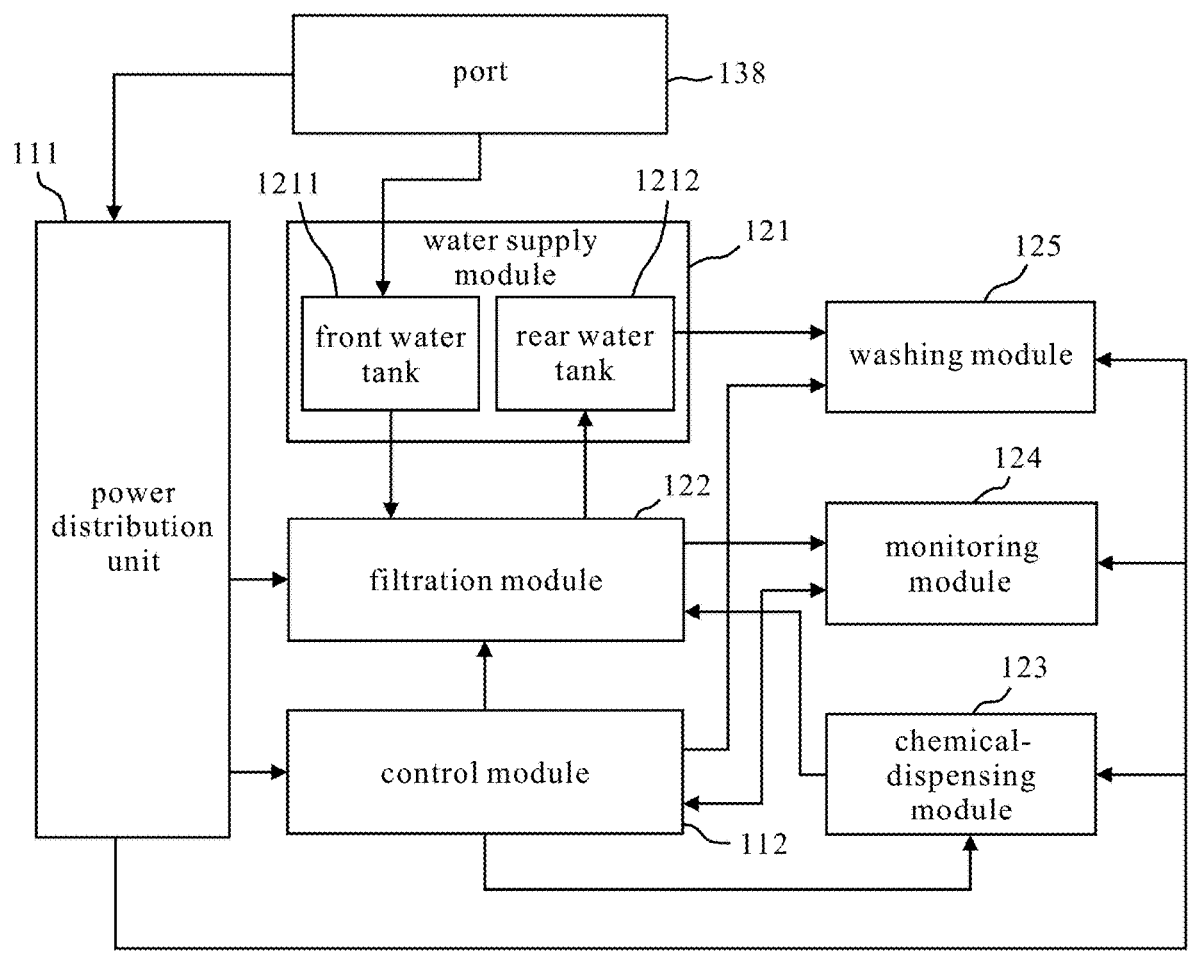
FIG. 4 is a block diagram of the mobile rustproofing washing system of the present invention.

Referring to FIG. 4, there is shown a block diagram of the mobile rustproofing washing system 100 of the present invention. The operation of the control module 112 is described hereunder. The control module 112 controls a plurality of electrically-operated valves 1227 of the filtration module 122 to turn on and turn off according to the water quality data sent from the at least a water quality monitoring unit 1241 and thus changes the combination of the filters 1222, 1223, 1224, 1225 which the washing water passes through, so as to meet various needs for water quality. The control module 112 controls the passage for water admitted to the plurality of control valves 1226 of the filtration module 122 and thus changes the direction of water flow, so as to facilitate the forward washing process and the reverse washing process. Afterward, the control module 112 controls a chemical-dispensing control valve 1231 of the chemical-dispensing module 123 according to the water quality data and thus controls the speed of dispensing chemicals. Furthermore, the water pressure, angle of elevation, orientation or spraying mode of the washing water cannon 1252 of the washing module 125 is adjusted. Last but not least, the shooting angle of the at least a video recording unit 1242 and frame distances are controlled during the washing process.

Figure 5:
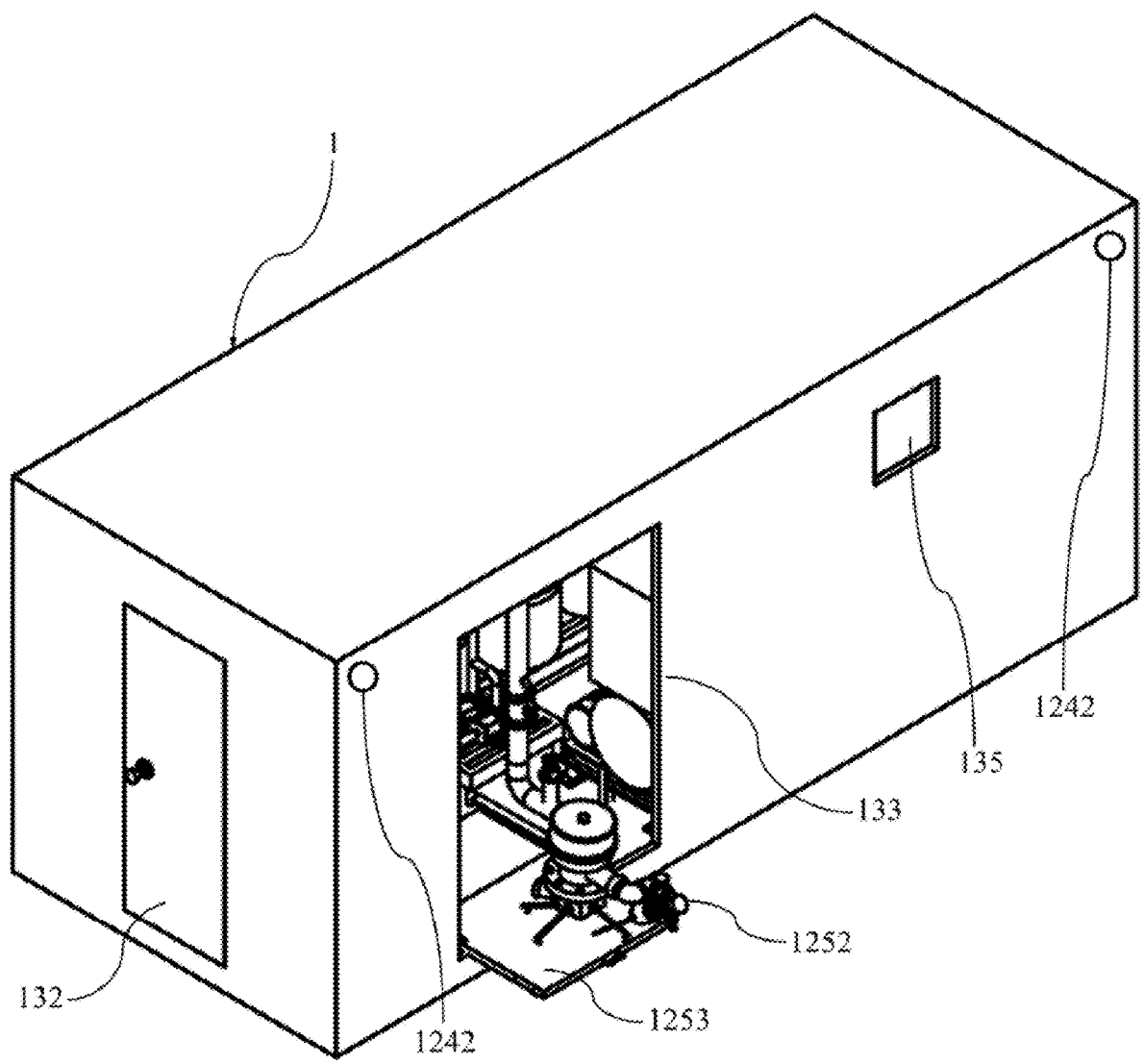
FIG. 5 is a schematic front view of the mobile rustproofing washing system of the present invention.
Figure 6:
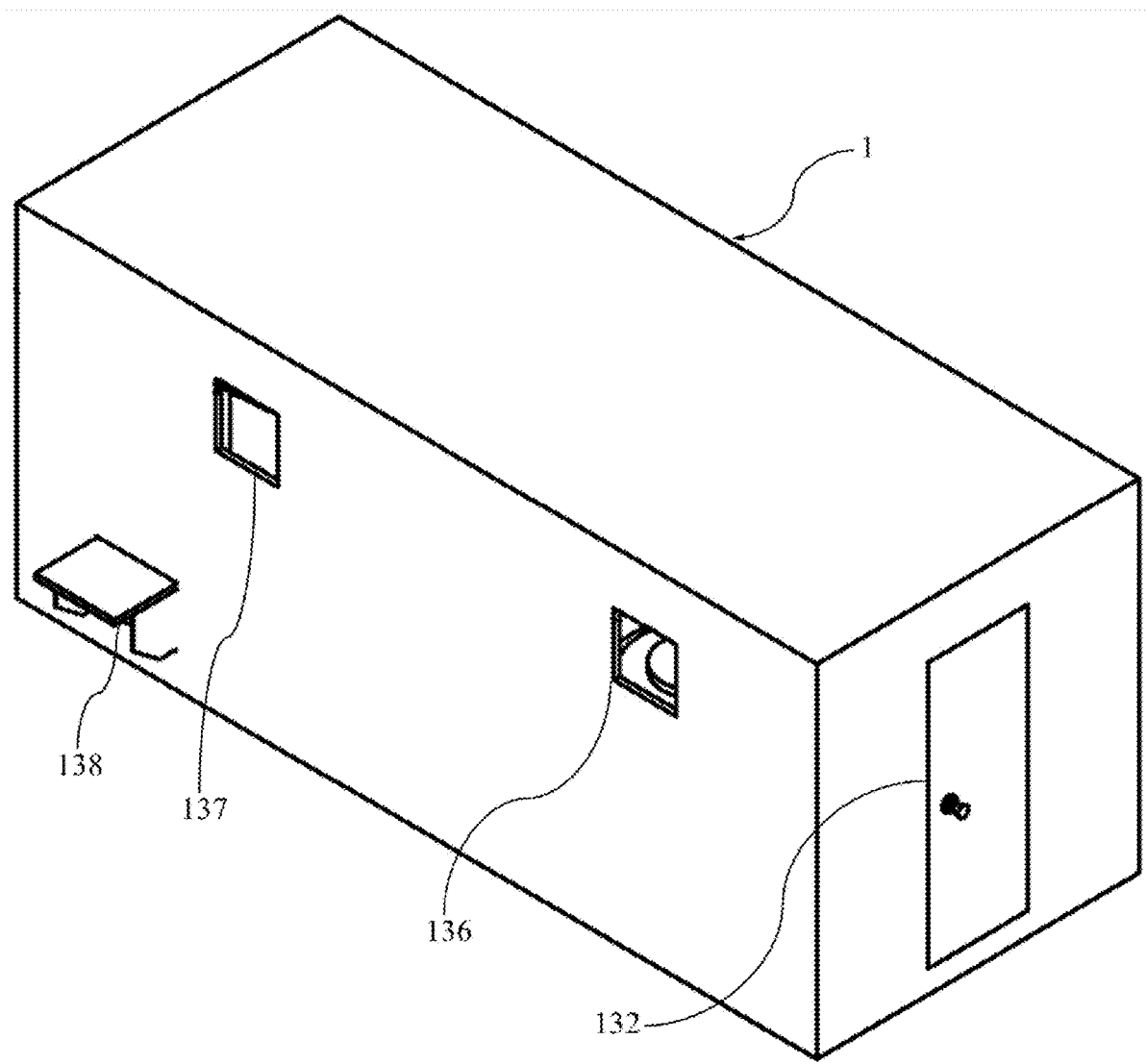
FIG. 6 is a schematic rear view of the mobile rustproofing washing system of the present invention.
Figure 7:
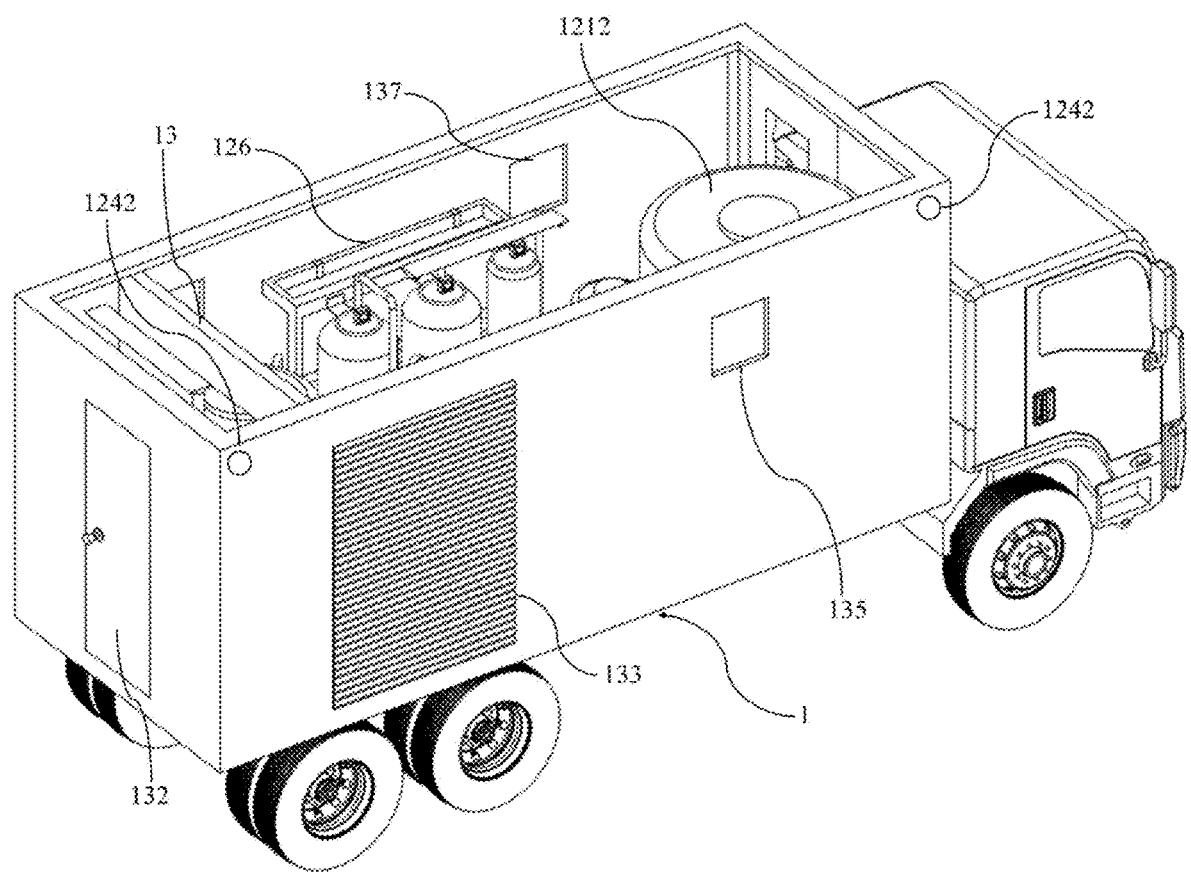
FIG. 7 is a schematic view of the mobile rustproofing washing system moving according to the present invention.

Referring to FIG. 5, FIG. 6 and FIG. 7, there are shown a schematic front view, a schematic rear view and a schematic view of the mobile rustproofing washing system 100 of the present invention. As shown in FIG. 5, FIG. 6 and FIG. 7, in this embodiment, the receptacle 1 is towed to an appropriate place by a tractor. After being unloaded, the receptacle 1 is ready for use, and the anti-corrosion washing facilities are built.

Figure 8:
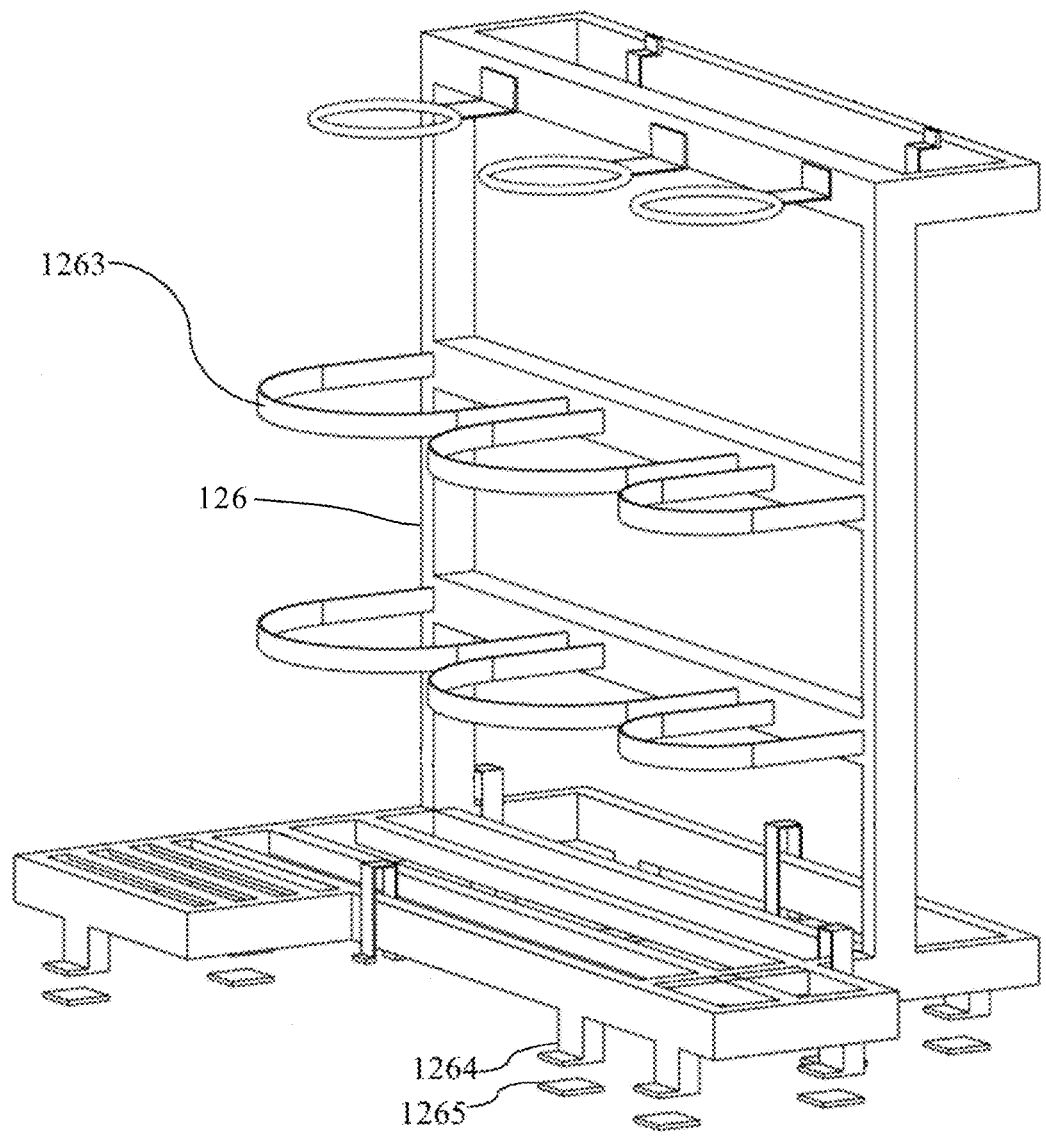
FIG. 8 is a schematic view of a supporting unit of the mobile rustproofing washing system of the present invention.

Referring to FIG. 8, there is shown a schematic view of a supporting unit of the mobile rustproofing washing system 100 of the present invention. In this embodiment, the mobile rustproofing washing system 100 further comprises a supporting unit 126 for fixing the modules in place. The supporting unit 126 comprises a plurality of annular fastening elements 1261, a plurality of L-shaped legs 1262, and a plurality of damping pads 1263. The annular fastening elements 1261 fix the control module 112, water supply module 121, filtration module 122 and washing module 125 to the supporting unit 126. The L-shaped legs 1262 are disposed at the bottom of the supporting unit 126 or on the lateral side thereof to fix the supporting unit 126 to the bottom side of the receptacle 1 or a wall. The damping pads 1263 are disposed between the control module 112, water supply module 121, filtration module 122, washing module 125 and supporting unit 126 or disposed between the L-shaped legs 1262 and the bottom side of the receptacle 1 or a wall.

Therefore, a mobile rustproofing washing system of the present invention has advantages as follows: quick to mount/demount and easy to use, thereby achieving highly mobile delivery and installation; U-shaped arrangement of modules enables the mobile rustproofing washing system to take up little space; introduction of anti-corrosion chemicals while aircraft are being washed augments the anti-corrosion capability of the aircraft; given a control module, technicians can perform maintenance and operate the mobile rustproofing washing system conveniently; and a washing water cannon is mounted on an outward-extending rail platform such that the washing water cannon is available for use as soon as the outward-extending rail platform is pulled out, thereby enhancing the ease of washing.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:
1. A mobile rustproofing washing system, comprising:
   a receptacle removably disposed on a mobile carrier;
   a control room disposed at one end of the receptacle, wherein the control room includes a control module and a power distribution unit, the power distribution unit is connected to the control module;
   a water supply module disposed in the receptacle to receive water and comprising a front water tank and a rear water tank, wherein the front water tank is disposed beside the control room to store washing water, the rear water tank is disposed at the other end of the receptacle;
   a fill pipe connected to the front water tank and rear water tank;
   a filtration module disposed at the fill pipe and connected to the front water tank and the rear water tank by the fill pipe, wherein the filtration module receives and filters water from the front water tank, the filtered water filtered by the filtration module being stored in the rear water tank;
   a chemical-dispensing module disposed at the fill pipe and being downstream of the filtration module and upstream of the rear water tank, wherein the chemical-dispensing module dispenses anti-corrosion chemicals to water;
   a washing module connected to the rear water tank to receive water therefrom and carry out a washing process, wherein the washing module includes a cannon pump, a washing water cannon and an outward-extending rail platform, the water cannon pump is connected to the rear water tank to receive water and pressurizes the water, the washing water cannon is mounted on the outward-extending rail platform and connected to the water cannon pump to receive the pressurized water, so as to facilitate the washing process, the outward-extending rail platform is extendably disposed at a window of the receptacle; and
   a passage parallel disposed between the washing module, the front water tank and the filtration module, wherein one end of the passage is in communication with the control room by a separation door.

2. The mobile rustproofing washing system of claim 1, wherein the receptacle is at least 20 feet long.

3. The mobile rustproofing washing system of claim 1, wherein the washing module is in communication with an outside by the window.

4. The mobile rustproofing washing system of claim 2, wherein the washing module is in communication with an outside by the window.

5. The mobile rustproofing washing system of claim 1, wherein the receptacle has at least a ventilation grill.

6. The mobile rustproofing washing system of claim 1, wherein the filtration module comprises a booster pump for receiving water from the front water tank and effecting pressurization.

7. The mobile rustproofing washing system of claim 6, wherein the filtration module further comprises:
   a first filter connected to the booster pump and having a filter medium including quartz sand;
   a second filter connected to the first filter and having a filter medium including activated carbon;
   a third filter connected to the second filter and having a filter medium including divinylbenzene copolymer; and
   a fourth filter connected to the third filter and having a filter element of a pore diameter of 0.1-20 μm.

8. The mobile rustproofing washing system of claim 1, further comprising a water quality monitoring unit connected to the filtration module to monitor a water quality data and send the water quality data to the control module.

9. The mobile rustproofing washing system of claim 1, further comprising a video recording unit disposed on an outer surface of the receptacle to capture a frame information and send the frame information to the control module.

10. The mobile rustproofing washing system of claim 1, wherein the washing water cannon whose water pressure, angle of elevation, orientation or spraying mode is controlled by the control module.

11. The mobile rustproofing washing system of claim 1, wherein the control module is connected to the chemical-dispensing module to control a chemical dispensing speed thereof.

12. The mobile rustproofing washing system of claim 7, wherein the control module connects with and controls the filtration module.

13. The mobile rustproofing washing system of claim 12, wherein the filtration module further comprises a plurality of control valves disposed at the filters to control water flow directions in the filters, respectively.

14. The mobile rustproofing washing system of claim 12, wherein the filtration module further comprises a plurality of electrically-operated valves disposed at the filters to guide water through the filters, respectively.

15. The mobile rustproofing washing system of claim 1, further comprising a supporting unit disposed in the receptacle, the supporting unit comprising:
   a plurality of annular fastening elements for fixing the control module, the water supply module, the filtration module and the washing module to the supporting unit;
   a plurality of L-shaped legs disposed at a bottom or a lateral side of the supporting unit to fix the supporting unit to a bottom side of the receptacle or a wall; and
   a plurality of damping pads disposed between the control module, the water supply module, the filtration module, the washing module and the supporting unit or disposed between the L-shaped legs and the bottom side of the receptacle or the wall.

\* \* \* \* \*